United States Patent Office 3,371,754
Patented Mar. 5, 1968

3,371,754
LOAD RESPONSIVE BRAKE SYSTEM
Pierre André Georges Lepelletier, Chatou, France, assignor to Societe Anonyme Francaise du Ferodo, a corporation of France
Filed Dec. 27, 1965, Ser. No. 516,576
Claims priority, application France, Jan. 11, 1965, 1,440
6 Claims. (Cl. 188—195)

ABSTRACT OF THE DISCLOSURE

A hydraulic brake for an automotive vehicle has a pair of brake shoes swingable in opposite directions under the influence of separate pistons and pressure chambers, so that the upstream end of one shoe (relative to the direction of rotation of the member to be braked) comes into firmer engagement with the rotatable member than its downstream end, while the downstream end of the other shoe comes into firmer engagement with the member to be braked than does its upstream end. A pressure limiter is placed in the hydraulic supply to the first-mentioned shoe, but not in the supply to the second mentioned shoe, because the first-mentioned shoe is the one that tends to cause the brake to lock, particularly under light load. The pressure limiter is made load responsive by a special spring arrangement.

---

The present invention has for its object an improved hydraulic brake for automobile vehicles, in which the moving member to be braked (drum, disc or the like) is acted upon by at least two piston means for the gripping of said member, especially characterized in that pressure means arcuate on the one hand one of said piston means through the intermediary of pressure-limiting means, and on the other hand act on the other piston means directly. When one of the piston means acts on the moving member to be braked by means of a device producing self-gripping, it is preferably this piston means which is actuated by the pressure means through the intermediary of pressure-limiting means.

The present invention has also for its object an application of brakes of the kind referred to, as the rear brakes of an automobile vehicle.

More particularly, the present invention relates to hydraulic braking installations for automobile vehicles comprising drum brakes, especially drum type rear brakes, in which each rear brake has a rotating drum, a fixed plate receiving cylinder means, a first jaw supported by one of its extremities on the first piston and by its other extremity on a fixed abutment, and a second jaw supported by one of its extremities on a fixed abutment and by its other extremity on the second piston, said jaws rubbing against the drum for the purpose of braking when the pistons are actuated.

During braking, the weight of the vehicle is transferred towards the front, which makes it necessary to provide braking which is less effective at the rear than at the front in order to prevent the rear wheels from becoming locked and thus risking an adverse effect on the stability of the vehicle, especially when the vehicle is only lightly loaded at the rear.

In the usual constructions of rear brakes, this reduced effectiveness, thus imposed during heavy braking, is maintained irrespective of the degree of braking. The result is, in the case of usual braking, a reduced total braking capacity and in addition, more severe working conditions on the front brakes, which may become subjected to considerable heating, particularly when driving in towns, where frequent brakings are effected. In this case, the front brakes are thus rendered less capable of ensuring a more intense braking, should the need arise.

The present invention has more particularly for its object improvements in braking installations for automobile vehicles, which enable the above-mentioned drawbacks to be eliminated by virtue of a particular method of applying a drum brake, especially a rear brake of an automobile vehicle.

The invention consists in particular in actuating independently the two jaws of the rear brake and in causing at least one of the jaws to work in at least two phases, one of which corresponds to an effort of application of the jaw on the drum which is constant, for example by arranging a pressure-limiter on the operating circuit of the said jaw.

More particularly, the improved drum brake according to the invention is of the type comprising a more compressed first jaw and a less compressed second jaw. It is preferably the jaw which is more compressed during forward running which is subjected to the pressure controlled by the limiting device.

The pressure means may consist for example of a piping system supplied by a master cylinder, or alternatively of a piping system supplied by a pressure resulting from the braking reaction developed in the front brakes.

In one preferred form of embodiment of the invention, the pressure-limiting means consist of an apparatus calibrated in such manner as to transmit the pressure when the latter does not exceed the value corresponding to the calibration, and to maintain the said value of pressure when the supply pressure becomes equal to or greater than the said value.

Thus, for light braking, in which the driving pressure does not counter-balance the calibration of the limiting device, the rear brake operates normally, the action on the more compressed jaw and on the less compressed jaw being effected in proportion to the sections of the two brake pistons. During a harder braking action, the limiter comes into action, and in this second phase the action on the first jaw remains constant and only the action on the second jaw continues to increase at the same time as the supply pressure. It will be noted that with such a construction, the brake rapidly acquires a characteristic very similar to a complete brake with such less compressed jaws.

The calibration of the limiter device may either be constant or variable as a function of a factor responsive to the conditions of operation, for example the load on the vehicle.

The objects, characteristic features and advantages of the invention will further be brought out from the description which follows below of forms of embodiment chosen by way of example, reference being made to the accompanying drawings, in which.

Figure 1:
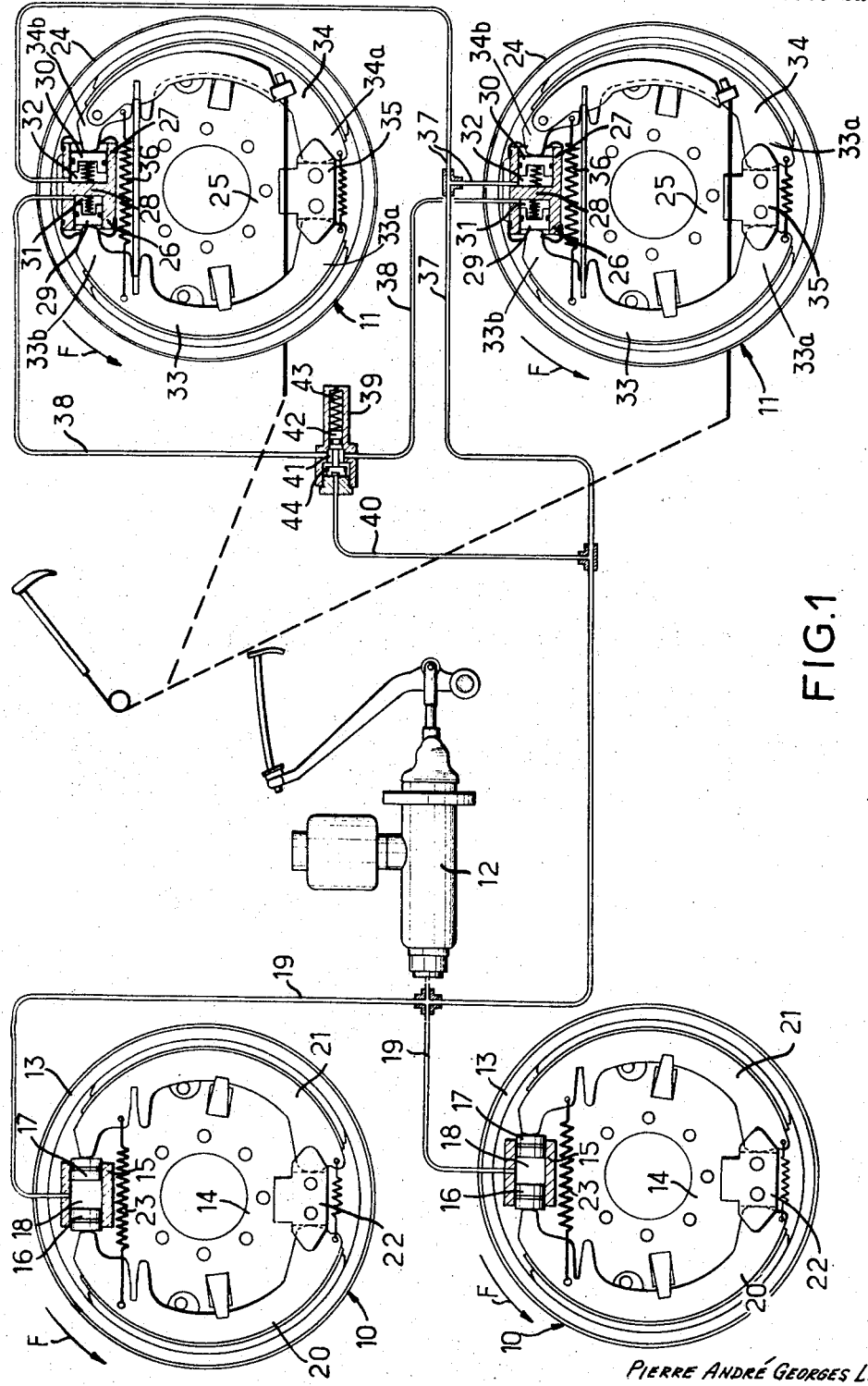
FIG. 1 is a diagram of a braking installation of an automobile vehicle in accordance with the invention.

Reference will first be made to FIG. 1, which concerns an application of the invention to the braking of an automobile vehicle having two front brakes 10 and two rear brakes 11, supplied hydraulically by a master cylinder 12. Each front brake 10 comprises a rotating drum 13, a fixed plate 14 receiving a cylinder 15 having two opposite pistons 16 and 17 which form a chamber 18 supplied by a pipe 19 from the master cylinder 12, a jaw 20 being supported by one of its extremities on the piston 16 and by its other extremity on a fixed abutment 22. On this abutment 22 is supported one of the extremities of a second jaw 21 which is supported by its other extremity on the piston 17. The jaws 20 and 21 are in frictional contact with the drum 13 for braking when the chamber 18 is put under pressure, and are returned to the position of rest spaced apart from the drum 13, by means of a spring 23 when the chamber 18 is not put under pressure.

Each rear brake 11 comprises a rotating drum 24, a fixed plate 25 receiving two opposite cylinders 26 and 27 separated by a partition 28 and having respectively two pistons 29 and 30 which form two independent chambers 31 and 32, a jaw 33 being supported by one end 33a on a fixed abutment 35 provided on the plate 25, and at its other end 33b on the position 29. A second jaw 34 is supported by one end 34a on the abutment 35 and by its other end 34b on the piston 30. End 33b is upstream of end 33a with respect to the direction of rotation of drum 24 during forward movement of the vehicle, while end 34a is upstream of end 34b with respect to that direction of rotation. The jaws 33 and 34 rub against the drum 24 for braking when the chambers 31 and 32 are put under pressure, and are returned to a position of rest, spaced apart from the drum 24, by means of a spring 36 when the chambers 31 and 32 are not under pressure.

Whereas the chambers 32 of the brakes 11 are directly connected by a piping system 37 to the master cylinder 12, the chambers 31 of the brakes 11 are connected by conduits 38 to a pressure-limiting device 39, supplied by a conduit 40, coupled to the master cylinder 12.

The limiter device 39 comprises a central chamber 41 with which communicate the conduits 38 and which is defined on one side by a sliding piston 42 controlled by a calibrated spring 43. On the other side, the chamber 41 is separated from the supply conduit 40 by a valve 44 which is rigidly fixed on the piston 42.

As long as the pressure in the conduit 40 remains less than a value which corresponds to the calibration of the spring 43, the valve 44 is open and the same pressure exists in the conduits 38 and the conduit 40. When the pressure in the conduit 40 becomes equal to or greater than the value which corresponds to the calibration of the spring 43, the valve 44 closes and isolates the conduits 38 from the conduit 40. The pressure in the conduits 38 remains equal to the pressure value corresponding to the calibration of the spring.

In FIG. 1, the arrows F indicate the direction of rotation of the drums 13 and 24 for forward running. When the chambers 31 and 32 are put under pressure when braking during forward running, the jaw 33 is compressed more than the jaw 34, because the action of drum 24 and piston 29 on jaw 33 are additive; while in the case of jaw 34, the drum 24 somewhat opposes the compression of jaw 34 between piston 30 and abutment 35.

During light or moderate braking, the operating pressure developed by the master cylinder 12 in the various conduits 19 and 37, especially in the conduit 40, does not counter-balance the action of the calibrated spring 43 of the limiter device 39. The rear brakes 11 function normally. The action on the jaw 33 and on the jaw 34 increases as a function of the pressure developed by the master-cylinder 12.

During a harder braking operation in which the pressure in the conduit 40 overcomes the resistance offered by the spring 43, the limiting device 39 comes into action and in this second phase, the action on the jaw 33 remains constant and only the action on the jaw 34 continues to increase with the pressure developed by the master-cylinder 12 in the conduits 37. The brake then functions as a brake with less compressed jaws.

In FIG. 1, the pistons 29 and 30 have been shown with different sections, the piston 29 having preferably a smaller diameter then the piston 30, for example a diameter equal to about 75% of the diameter of the piston 30. Other proportions could however be adopted. The two pistons could have the same diameter and, if so required, the piston 39 could even be larger than the piston 30.

It is by selecting the value of these sections that it is possible to choose the degree of increase of the torque developed by the jaws as a function of the pressure developed by the master-cylinder in each of the two successive phases of operation (that is to say respectively before and after the coming into action of the limiter 39), and it is by selecting the value of the calibration of the spring 43 that it is possible to choose the point of transition between these two phases.

In the example shown in FIG. 1, the calibration of the limiter device 39 by means of a spring such as 43 can be adjustable in the first place, but is provided to be fixed during operation.

According to the invention, the calibration of the limiter-device 39 could also be made variable during operation, in particular as a function of one or more factors responsive to the conditions of operation, for example the load on the vehicle, so that the limiter comes into action at a higher pressure when the vehicle is heavily loaded than when the vehicle is only lightly loaded.

Figure 2:
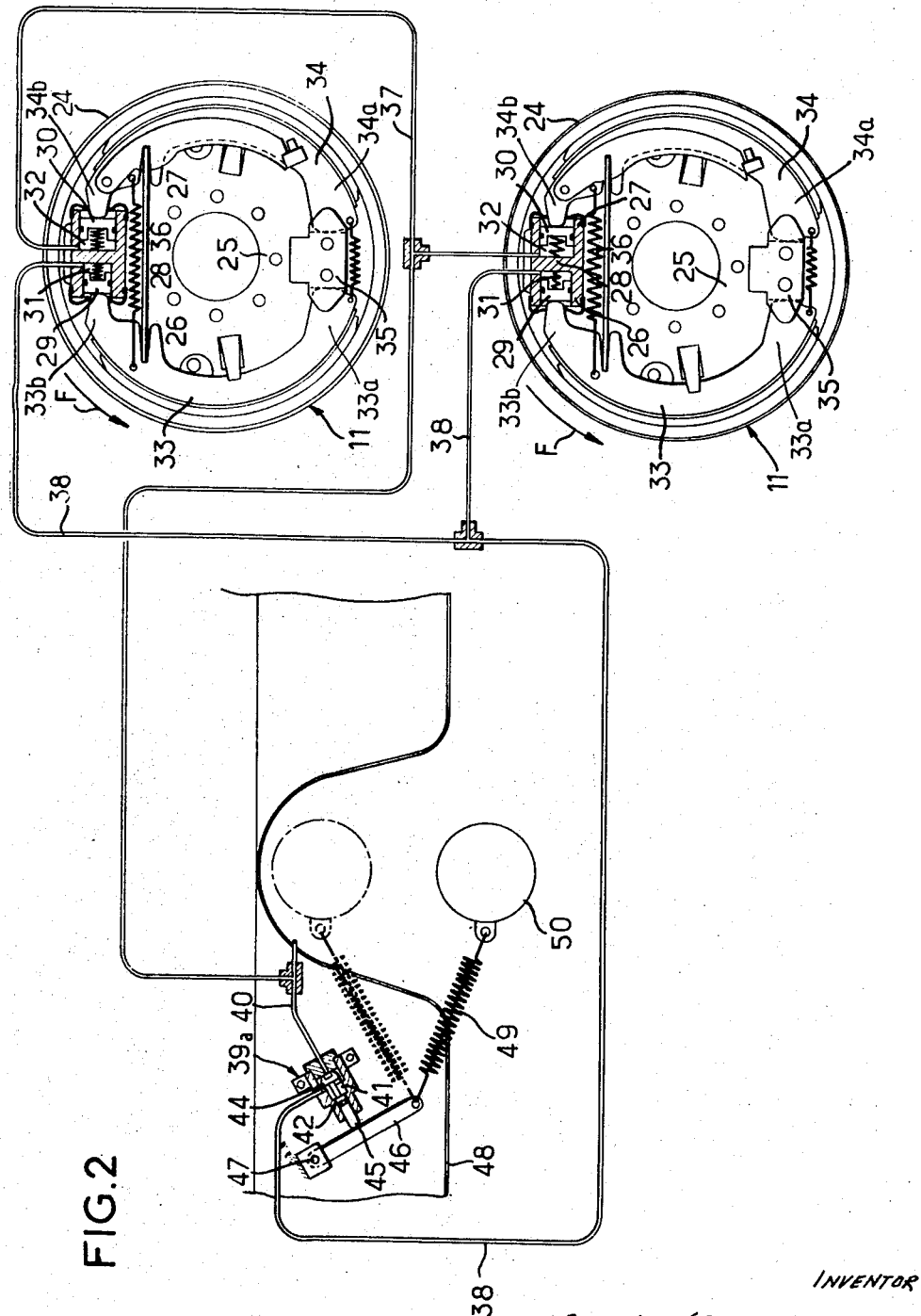
FIG. 2 is a partial diagram of an alternative form of construction.

Reference will now be made to FIG. 2, in which the limiter-device 39a has a calibration variable in dependence on the load on the vehicle. There will be again seen in FIG. 2, at 31, the central chamber of the limiter with which communicates the supply pipe 38 to the chambers 31 and which is separated from the conduit 40 by the valve 44 rigidly fixed to the piston 42. In this case however, the piston 42 terminates in a finger 45 supported on an arm 46 pivotally mounted at 47 on the chassis 48 of the vehicle.

The arm 46 is coupled by a spring 49 to a suspension tube 50 which occupies the position shown in full lines when the vehicle is empty, and the position in chain-dotted lines when the vehicle is loaded.

It can be seen from FIG. 2 that in the first case the spring acts almost in line with the pivotal axis 47 of the arm 46, that is to say with little effect to give any thrust by the arm 46 on the finger 45, whereas in the second case the spring acts perpendicularly to a radius starting from the axis 47, that is to say with great effect in giving a thrust by the arm 46 on the finger 45.

In the intermediate conditions of load on the vehicle, the tube 50 occupies positions intermediate between the position shown in full line and that shown in chain-dotted lines, and the effectiveness of the spring 49 is also intermediate.

In other words, the calibration of the limiter-device is made higher as the vehicle is more heavily loaded, which makes it possible to obtain excellent braking conditions under all circumstances. It will be appreciated in fact that when a vehicle is lightly loaded, only a small braking power is necessary, but its rear wheels are fairly likely to suffer some loss of adhesion. In this case, the limiting device, calibrated at a low value, is sufficient to ensure braking while normally preventing locking of the rear wheels. When the vehicle is heavily loaded, it necessitates a higher braking power but its rear wheels have less tendency to lose their adhesion. In this case also, the limiter which is calibrated to a high value, permits a large braking power and is sufficient to prevent the rear wheels normally from becoming locked.

The invention is of course not limited to the forms of construction described and shown but includes all alternative forms. For example, the invention is also applicable to a braking device in which the rear brakes are operated by a pressure resulting from a braking reaction in the front brakes, etc. The invention has been described with drum brakes because these are the most frequently employed, due for example to the facility with which the hand brake can be incorporated. The invention also relates however, amongst others, to disc brakes comprising at least two gripping pistons, one of which is supplied directly and the other through the intermediary of pressure-limiting means, etc.

What I claim is:

1. A hydraulic brake for an automotive vehicle, comprising a rotating member to be braked, brake shoe means movable into braking contact with said rotating member, cylinder means having a chamber with a piston that acts against said shoe means to urge said shoe means into braking contact with said rotating member, means for supplying hydraulic fluid under pressure to said chamber to actuate said shoe means, means for limiting the pressure in said chamber, calibration means for said limiting means, said calibration means comprising a valve for controlling the supply of hydraulic fluid to said chamber, a spring acting on said valve along a line of force, and means responsive to changing vehicle load for changing the position of said spring means so as to change the direction of said line of force so that the maximum pressure determined by said limiting means decreases with decreasing vehicle load.

2. A hydraulic brake as claimed in claim 1, said calibration means comprising a lever for moving said valve means, said spring means acting on said lever.

3. A hydraulic brake as claimed in claim 2, one end of said spring means being connected to said lever, the other end of said spring means being connected to a portion of said vehicle that moves vertically with changing vehicle load.

4. A hydraulic brake for an automotive vehicle, comprising a rotating member to be braked, a pair of brake shoes, means supporting each of the brake shoes at one end of the brake shoes, cylinder means having a pair of chambers with a piston in each chamber, said pistons acting separately against the other ends of said shoes to urge the shoes into braking contact with said rotating member, said one end of one of said shoes being disposed upstream of said other end of said one shoe with respect to the direction of rotation of said rotating member during forward movement of the vehicle, said other end of the other of said shoes being disposed upstream of said one end of said other shoe with respect to said direction of rotation, means for supplying hydraulic fluid under pressure to said chambers to actuate said shoes, and means for limiting the pressure in said chamber associated with said other shoe to a maximum value lower than the maximum value of the pressure in said chamber associated with said one shoe, said pressure-limiting means having calibration means variable as a function of the load on the vehicle.

5. A hydraulic brake as claimed in claim 4, utilized as the rear brake of an automotive vehicle.

6. A brake as claimed in claim 4, said limiting means having calibration means including a valve for controlling the supply of hydraulic fluid to said chamber associated with said other shoe, a spring acting on said valve along a line of force, and means for altering the direction of said line of force of the spring in response to changes in the load on the vehicle, in a direction to reduce said maximum value of the pressure in said chamber associated with said other shoe upon decreasing vehicle load.

References Cited

UNITED STATES PATENTS

| | | | |
|---|---|---|---|
| 2,189,224 | 2/1940 | Roberts | 188—152 |
| 2,494,319 | 1/1950 | Swan | 188—152 |
| 2,574,426 | 11/1951 | Trevaskis | 188—195 X |
| 2,657,774 | 11/1953 | Perrot | 188—195 |
| 3,191,999 | 6/1965 | Cordiano | 302—22 |

FOREIGN PATENTS

| | | |
|---|---|---|
| Ad. 71,181 | 3/1959 | France. |
| 608,810 | 9/1948 | Great Britain. |

MILTON BUCHLER, *Primary Examiner.*

G. E. HALVOSA, *Assistant Examiner.*